United States Patent [19]

Spigarelli et al.

[11] Patent Number: 5,220,147
[45] Date of Patent: Jun. 15, 1993

[54] ELECTRONIC COMPONENT HEATER

[75] Inventors: Donald J. Spigarelli, Groton; Robert E. Cushman, W. Groton, both of Mass.

[73] Assignee: Sierra Research and Technology, Westford, Mass.

[21] Appl. No.: 750,097

[22] Filed: Aug. 26, 1991

[51] Int. Cl.[5] .................. B23K 1/012; B23K 3/04
[52] U.S. Cl. ..................... 219/85.1; 219/230; 228/20; 228/51; 392/379
[58] Field of Search ............ 219/85.1, 85.16, 230, 219/233; 392/379; 126/413, 414; 228/20, 51

[56] References Cited

U.S. PATENT DOCUMENTS

| 1,831,799 | 11/1931 | Anderson | 126/413 |
| 5,054,106 | 10/1991 | Fortune | 219/230 |

FOREIGN PATENT DOCUMENTS 3739750 6/1989 Fed. Rep. of Germany ...... 219/233

2-41771 2/1990 Japan ..................... 392/379

OTHER PUBLICATIONS

Unitek Product Catalog, "Applying Process Control to Pulse Heated Reflow Soldering", Catalog 239, Unitek Equipment Division, 1820 South Myrtle Avenue, Monrovia, Calif. 91016-5093, Sep., 1987, pp. 1-32.
Unitek, "Thermocouple Welder, Model TCW" specification, (TCWMAN.PT1), Nov., 1988, pp. 1-3.

Primary Examiner—Geoffrey S. Evans
Attorney, Agent, or Firm—Weingarten, Schurgin, Gagnebin & Hayes

[57] ABSTRACT

A contact heater for soldering and desoldering electronic components that is heated by hot air supplied into a cavity of the contact heater. A thermally conductive heating blade is used to contact an area to be heated, while a heat shield protects adjacent electronic components from external heat generated by the contact heater.

7 Claims, 5 Drawing Sheets

ELECTRONIC COMPONENT HEATER

FIELD OF THE INVENTION

The invention relates to contact heaters for connecting electronic components to, and removing components from, a printed circuit board and more particularly to a contact heater which is heated by hot air.

BACKGROUND OF THE INVENTION

In the electronics industry, it is frequently necessary to remove electrical components from, and solder components onto, a printed circuit board with great care and accuracy. Due to the sensitivity of electronic components to heat and electro-magnetic radiation, it is also desirable to shield components adjacent to the work area from heat generated by the heaters used in the connection process. As electronic components become increasingly miniaturized, with a corresponding increase in fragility and sensitivity, heaters must have increased accuracy. In addition, it is desirable that the heaters provide greater protection against thermal and electro-magnetic damage to adjacent components.

Prior systems, such as those illustrated in FIG. 1A, 1B, and 1C, utilize electrical resistance to heat the contact heater. The disadvantage of these prior art systems is that the heaters tend to generate electro-magnetic interference which can damage sensitive electronic components adjacent to the area to be heated.

SUMMARY OF THE INVENTION

It is the purpose of the present invention to provide a contact heater which applies heat directly to a predetermined area while reducing the possibility of thermal and electro-magnetic interference damage to adjacent components. Whereas prior contact heaters utilize electrical resistance to heat the contact heater to the required temperature, the present invention utilizes hot air.

In one embodiment of the present invention, hot air is directed to the internal cavity of the contact heater which, once the desired temperature has been reached, is applied directly to the desired component or area. An outlet is provided to permit the air to exit the contact heater away from the circuit board. The outlet may be aligned so as to direct the exiting air toward a component to preheat the contacts of the component prior to connecting the component to the circuit board.

In another embodiment, a heating blade and heat shield are attached to the contact heater assembly to provide enhanced heating accuracy and to protect adjacent areas and components from damaging thermal emanations. Hot air exits the assembly through outlets and is directed toward the heating blade. When the desired heating blade temperature is reached, the heating blade is applied to the area to be heated. A heat shield, also attached to the contact heater, protects adjacent components from the hot air.

DESCRIPTION OF THE DRAWINGS

Other objects, features and advantages of the invention will be best understood from the following detailed description, taken in conjunction with the accompanying drawing in which:

FIG. 6E illustrates a mounting panel of the present invention with four apertures and including vertical portions.

DETAILED DESCRIPTION

Figure 1A:
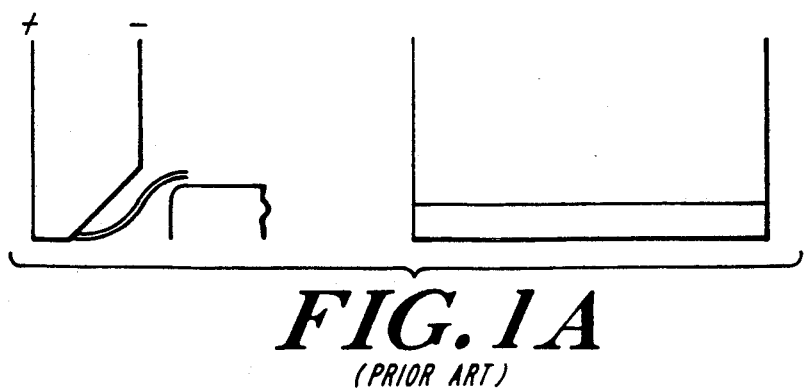
FIG. 1A illustrates a prior art electrically heated contact heater.
Figure 1B:
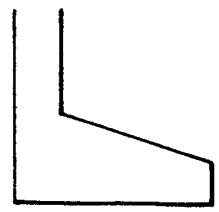
FIG. 1B illustrates a prior art electrically heated contact heater.
Figure 1C:
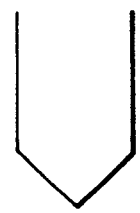
FIG. 1C illustrates a prior art electrically heated contact heater.
Figure 2:
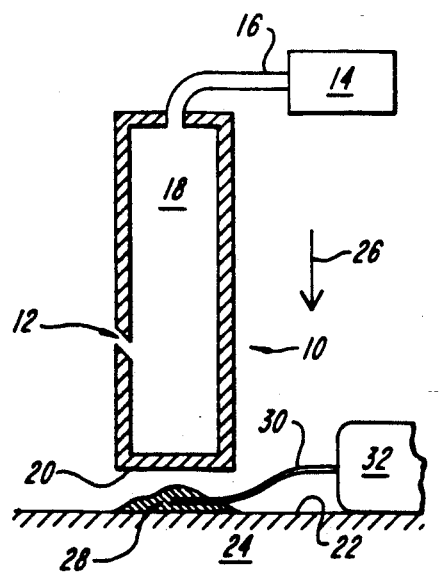
FIG. 2 illustrates a contact heater of the present invention having an outlet.

Referring to FIG. 2, a first embodiment of the present invention is illustrated. In this embodiment, contact heater 10 includes at least one outlet 12. Hot air is directed from relatively remote hot air supply 14 via hose 16 into contact heater cavity 18. When the hot air within contact heater cavity 18 has caused the head 20 of contact heater 10 to reach the desired temperature, head 20 is moved towards the surface 22 of circuit board 24. When contact is made between head 20 and solder pad 28, heat transfer causes solder pad 28 to reflow. Thereafter, head 20 is removed from reflowed solder pad 28 and contact 30 of integrated circuit (I.C.) 32 is connected to circuit board 24 by immersion in the reflowed solder pad 28. By angling outlet 12 away from the surface 22 of circuit board 24 and away from I.C. 32, hot air exiting contact heater 10 is prevented from heating the circuit board 24 or I.C. 32.

Figure 3:
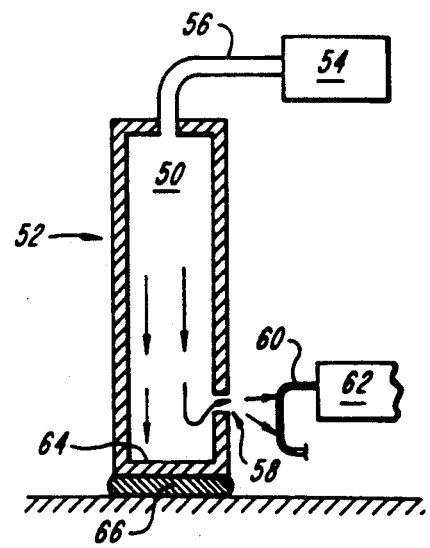
FIG. 3 illustrates a contact heater of the present invention having an outlet for directing air to preheat an adjacent component.

Referring now to FIG. 3, a second embodiment of the contact heater of the present invention is illustrated. In this embodiment, hot air is directed into cavity 50 of contact heater 52 from relatively remote hot air supply 54 via hose 56. At least one outlet 58 is oriented to direct air exiting contact heater 52 toward contact 60 of I.C. 62 which is to be connected to solder pad 66. Thus, while head 64 is in contact with, and reflowing solder pad 66, hot air exiting through outlet 58 is preheating contact 60 of the next component to be connected. Outlet 58 may be dimensioned according to the number, disposition and size of contacts 60 to be preheated. Such preheating of tinned I.C. contacts facilitates the connection of such contacts to the solder pads and circuit board.

Figure 4:
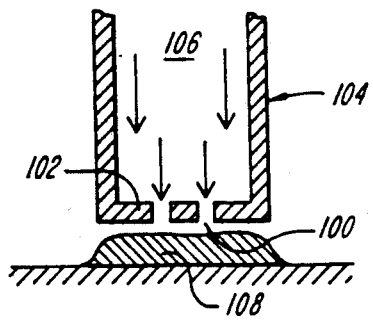
FIG. 4 illustrates a contact heater of the present invention having outlets for directing heat to preheat the area to be heated by contact.

Referring to FIG. 4, a third embodiment of the present invention is illustrated. In this embodiment, outlets 100 are disposed in head 102 of contact heater 104. Hot air exits heater cavity 106 through outlets 102 toward solder pad 108. Thus, solder pad 108 is preheated by the hot air prior to contact with heated head 102 to facilitate connection.

Figure 5:
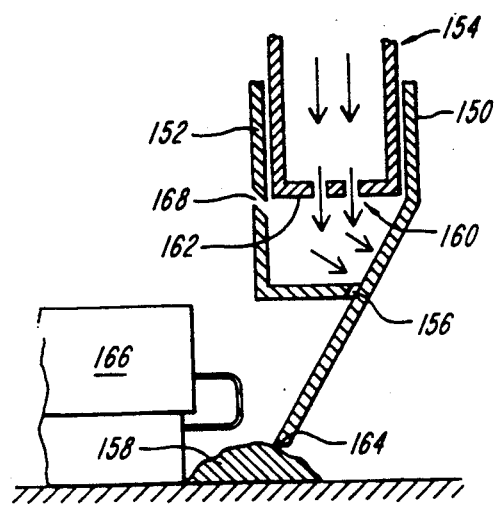
FIG. 5 illustrates a contact heater of the present invention having a heating blade and heat shield.

Referring now to FIG. 5, a fourth embodiment of the present invention is illustrated. In this embodiment, a heating blade 150 and heat shield 152 are attached by conventional means to heater 154. Heating blade 150 is connected to heat shield 152 and is fabricated of material having good thermal conductivity, such as aluminum. Heat shield 152 may be fabricated of aluminum or of a material which has a lower degree of thermal conductivity. The depending portion 156 of heating blade 150 may be angled toward heat shield 152 as illustrated or may be angled as otherwise desired to achieve the intended contact between contact heating blade 150 and, for example, solder pad 158.

Outlets 160 disposed in head 162 of contact heater 154 direct air toward heat shield 152 and depending portion 156 of heating blade 150. As heating blade 150 is made of a thermally conductive material, heat is transferred through heating blade 150 to heat the distal end 164 to the desired temperature. Heat shield 152 protects I.C. 166 from the hot air which heats heating blade 150. Exhaust port 168 directs hot air away from I.C. 166 to further reduce the possibility of heat damage to I.C. 166.

Figure 6A:
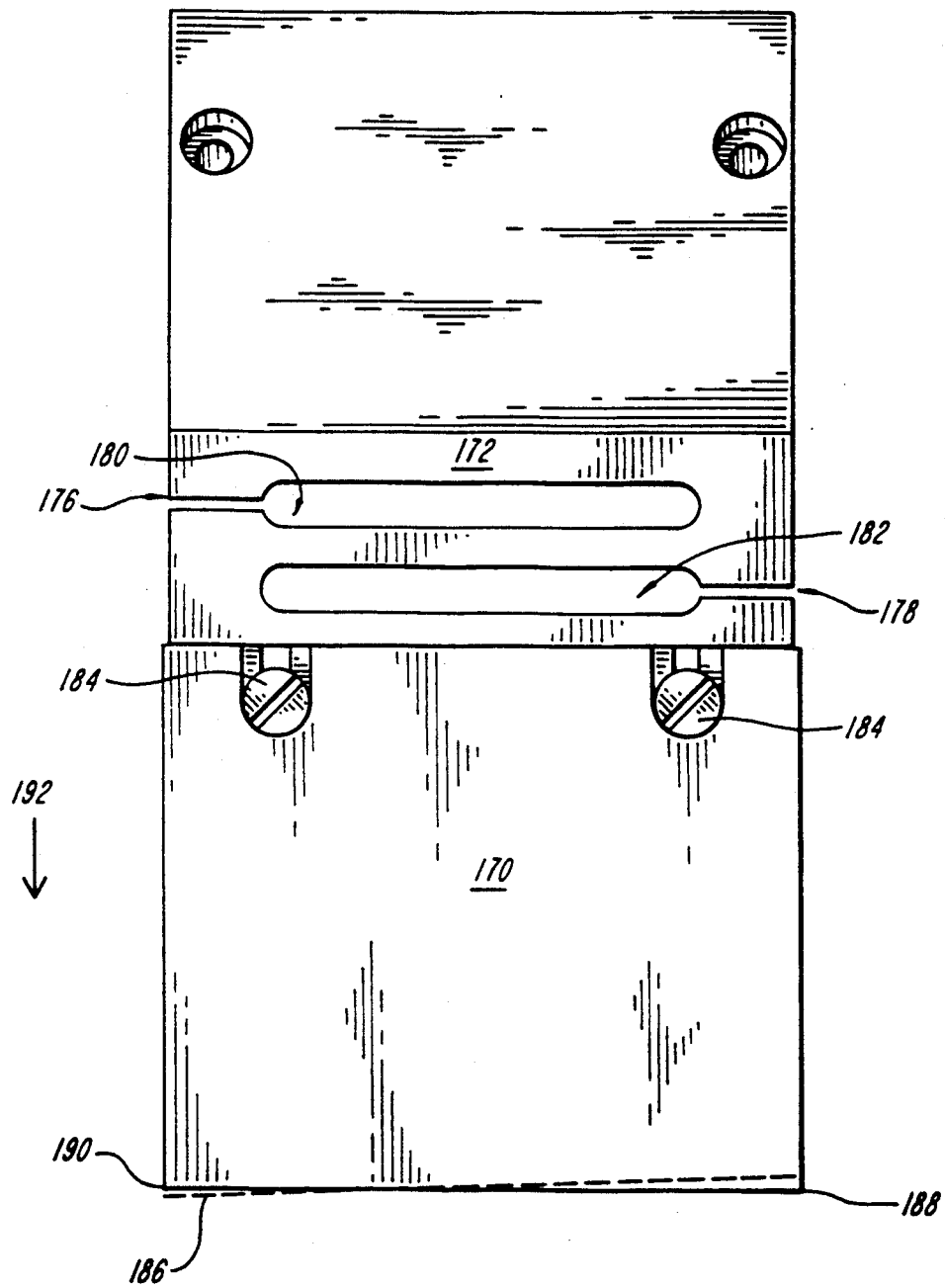
FIG. 6A illustrates a heating blade of the present invention connected to a deformable mounting panel.
Figure 6B:
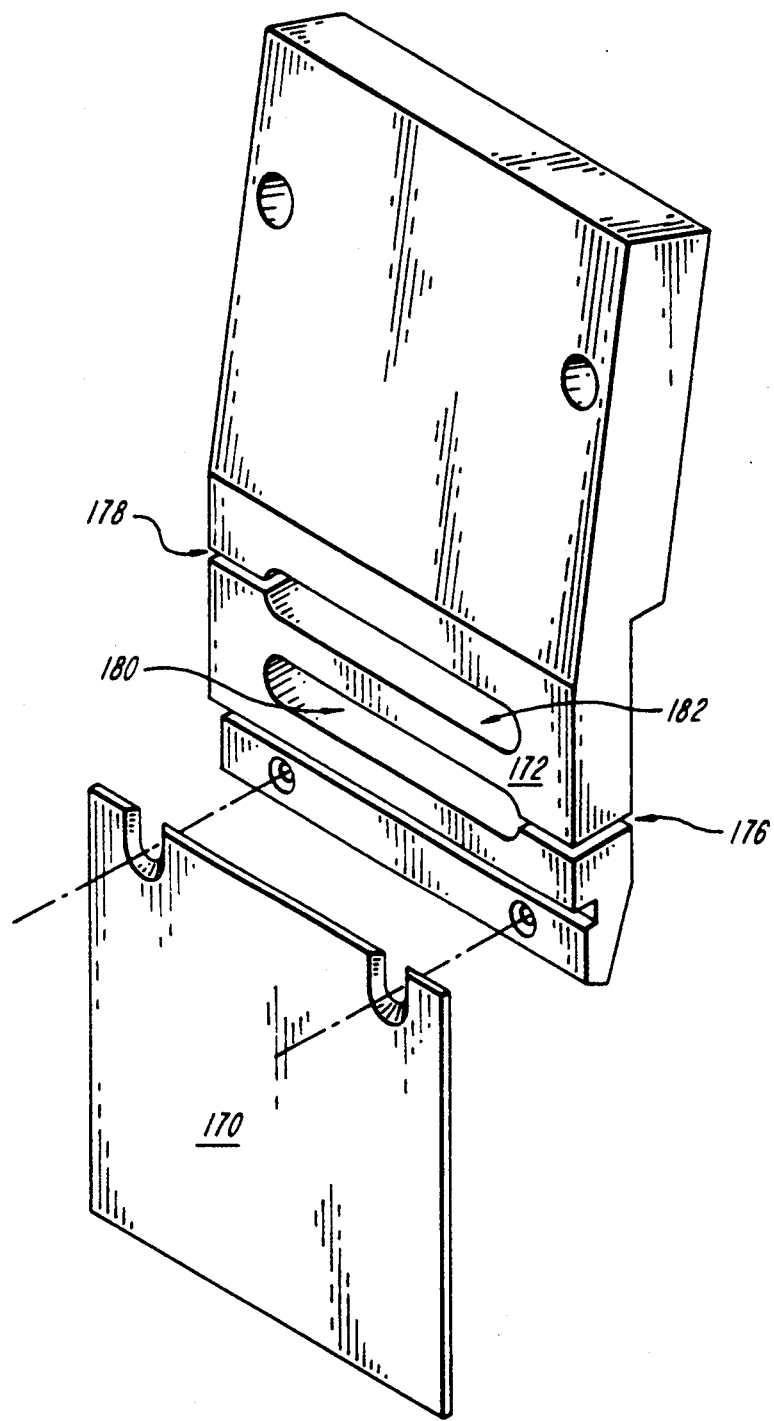
FIG. 6B illustrates a perspective exploded view of the heating blade and mounting panel of the present invention.

Referring now to FIG. 6A and 6B, a fifth embodiment of the contact heater of the present invention is illustrated. In this embodiment, contact heating blade 170 is attached to a flexible mounting panel 172 which, in turn is mounted upon heater 174. In the embodiment illustrated, mounting panel 172 is integrally formed and includes first and second slits 176, 178 which cooperate with first and second apertures 180, 182, respectively. Screws 184 or other well-known attaching means, such as spot-welding, are used to attach contact heating blade 170 to flexible mounting panel 172.

The serpentine configuration of flexible mounting panel 172 allows this embodiment of the present invention to compensate for unlevel heating environments. For example, if contact heating blade 170 is applied to an unlevel surface, as illustrated in FIG. 6A by dotted line 186, a first corner 188 will initially make contact with surface 186 but the second corner 190 will initially not. As force is applied to heater 174 in the direction indicated by arrow 192, first slit 176 and first aperture 180 are diminished and second slit 178 and second aperture 182 are enlarged. This causes movement of second corner 190 in the direction indicated by arrow 192 to bring corner 190 into contact to heat surface 186.

Figure 6C:
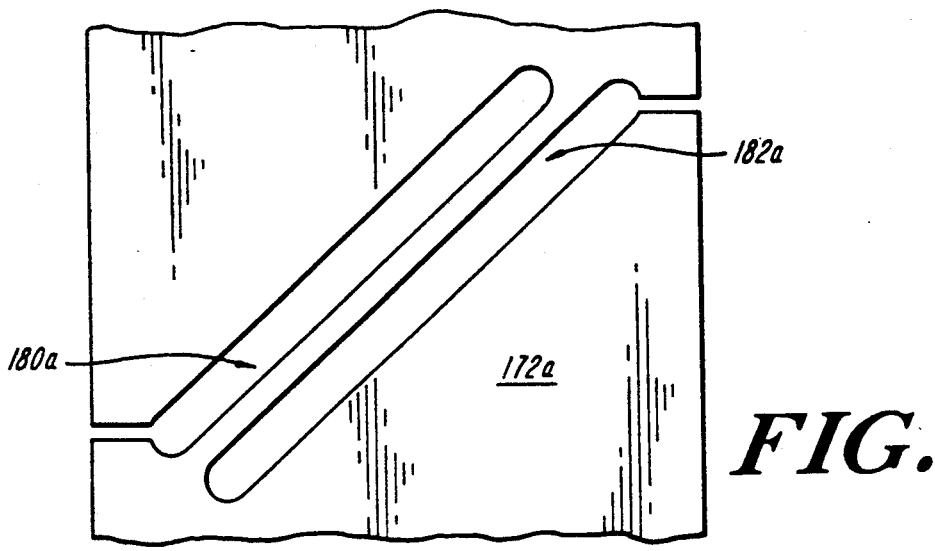
FIG. 6C illustrates a mounting panel of the present invention with two diagonal apertures.
Figure 6D:
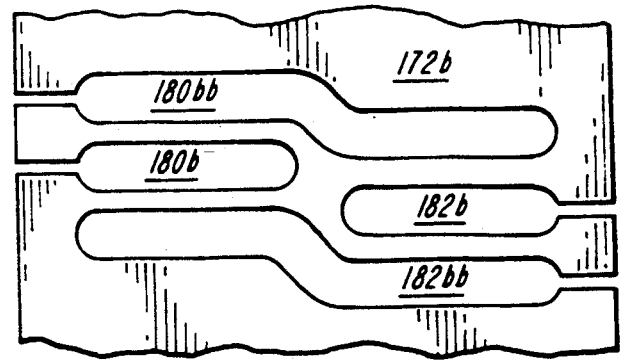
FIG. 6D illustrates a mounting panel of the present invention with five apertures.
Figure 6E:
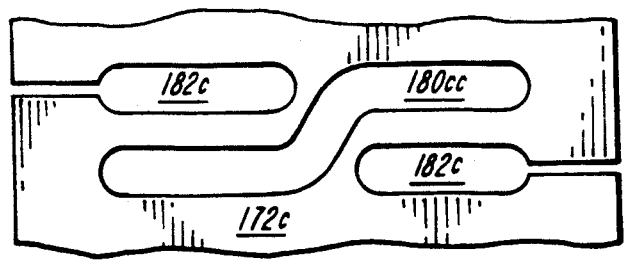
FIG. 6E illustrates a mounting panel of the present invention with three apertures.
Figure 6F:
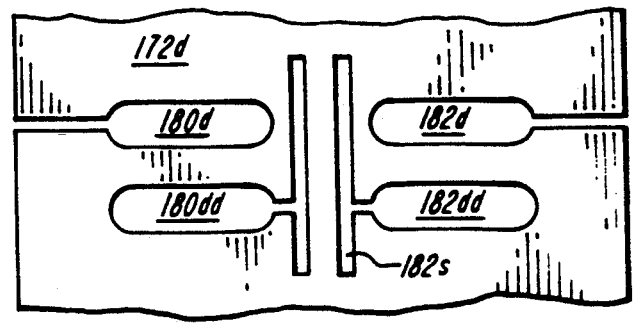

Referring now to FIGS. 6C-6F, other embodiments of the flexible mounting panel of the present invention are illustrated. In FIG. 6C, mounting panel 172a includes diagonal apertures 180a and 182a. In FIG. 6D, mounting panel 172b includes horizontal apertures 180b, 182b and S-shaped apertures 180bb and 182bb. In FIG. 6E, mounting panel 172c includes horizontal apertures 180c, 182c and S-shaped aperture 180cc. In FIG. 6F, mounting panel 172d includes horizontal apertures 180d, 182d. Mounting panel 172d further includes third and fourth apertures 180dd, 182dd, which communicate with vertical slits 180s, 182s, respectively. The configuration of the apertures and slits illustrated in FIGS. 6C-6F provide differing degrees of flexion to compensate for variations in the topography and resiliency of the work area.

Figure 7:
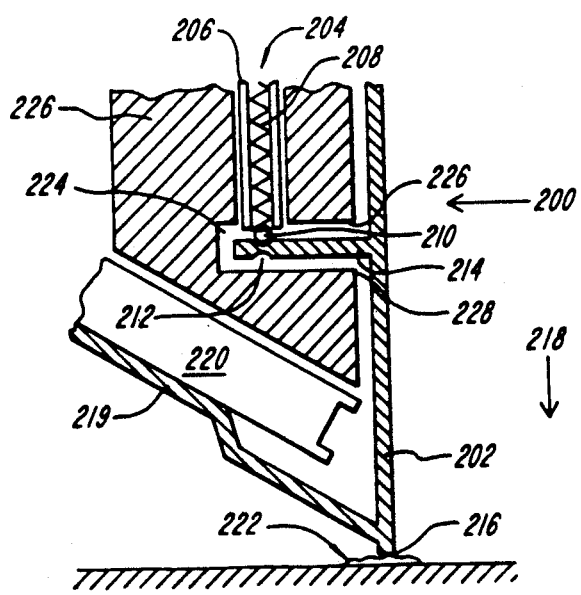
FIG. 7 illustrates a contact heater of the present invention having a movable heating blade and a heat shield.

Referring now to FIG. 7, another embodiment of the contact heater of the present invention is illustrated. In this embodiment, contact heater 200 comprises movable heating blade 202 and spring loaded detent pin 204. Spring loaded detent pin 204 comprises a generally cylindrical body 206 housing spring 208 and partially housing ball 210. Spring 208 urges ball 210 outwardly from the cylindrical body 206 to cooperate with annular detent 212 disposed on arm 214 of heating blade 202. Thus, when distal end 216 of heating blade 202 is not in contact with the material to be heated, heating blade 202 is biased, by the cooperation of spring loaded detent pin 204 and annular indent 212, in the direction indicated by arrow 218.

In operation, heated air is directed through heating element 220 against heating blade 202. When distal end 216 of heating blade 202 has reached the desired temperature, it is moved into contact with the material to be worked on, for example, solder pad 222. As distal end 216 is urged into contact with solidified solder pad 222, arm 214 exerts a force against ball 210. Thus, arm 214 is movable between upper surface 226 and lower surface 228 of cavity 224 in heater body 226 to provide a degree of "give" when contact is made, thereby reducing the risk of damage to the heater or to the work area. It will be appreciated by those skilled in the art, that the degree of movement of arm 214, and therefore of heating blade 202, it is determined by the relative dimensions of arm 214, cavity 224 and the location and spring characteristics of spring loaded detent pin 204. It will also be appreciated that the degree of movement of heating blade 202 should be determined with respect to the material to be worked on to permit movement of heating blade 202 to minimize the likelihood of damage to contact heater 200 and distal end 216 thereof in particular. Heat shield 219 directs hot air away from the work area to avoid damage to heat sensitive elements. Alternatively, the present invention may be heated by other means which do not produce the harmful radiation of the prior art, such as by infra-red radiation.

The description above is intended to be exemplary of embodiments of the present invention which is defined according to the following claims.

We claim:

1. A contact heater assembly for providing heat to a predetermined location to permit the connection and disconnection of electronic components with respect to a circuit board, comprising:
   means for supplying hot air from a source
   a body having an interior cavity and including at least one inlet, one wall, a first end and at least one outlet to permit the passage of air therethrough;
   a heating blade connected to said body proximate said first end and constructed of a heat conducting material;
   a heat shield connected to said heating blade to define a cavity exterior to said body to receive air passing through said at least one outlet from said body;
   means for allowing air to exit said exterior cavity, and
   a hose connecting said at least one inlet to said means for supplying a source of hot air.

2. The contact heater assembly of claim 1 wherein said means for allowing air to exit said exterior cavity includes an exhaust outlet disposed in said heat shield.

3. The contact heater assembly of claim 1 wherein said heating blade is made of aluminum.

4. The contact heater assembly of claim 1 wherein said heat shield is connected to said body to define said exterior cavity.

5. The contact heater of claim 1 wherein said heating blade comprises:

a first member mounted on said body, and a second member removably attached to said first member.

6. The contact heater of claim 5 wherein said heating blade first member includes resilient deformable means for permitting said first member to resiliently deform when force is applied to said first member.

7. A contact heater assembly for providing heat to a predetermined location to permit the connection and disconnection of electronic components with respect to a circuit board comprising:

means for supplying a source of hot air;

a body having a spring loaded detent pin receiving cavity and an arm receiving cavity;

a spring loaded detent pin disposed in said spring loaded detent pin receiving cavity and comprising:

a housing;

spring means disposed within said housing, and a ball cooperative with said spring means and partially disposed within said housing;

a heating blade mounted on the contact heater, said heating blade having an arm and a distal end, said arm dimensioned for insertion into said arm receiving cavity and having an annular detent for cooperating with said spring loaded detent pin ball and;

wherein said means for supplying a source of hot air is disposed to direct hot air towards said heating blade proximate the distal end of said heating blade.

* * * * *

UNITED STATES PATENT AND TRADEMARK OFFICE
CERTIFICATE OF CORRECTION

PATENT NO. : 5,220,147
DATED : June 15, 1993
INVENTOR(S) : Donald J. Spigarelli

It is certified that error appears in the above-identified patent and that said Letters Patent is hereby corrected as shown below:

Column 2, line 24, "FIG. 6E" should read --FIG. 6F--.

Signed and Sealed this

Sixteenth Day of August, 1994

*Attest:*

BRUCE LEHMAN

*Attesting Officer*  *Commissioner of Patents and Trademarks*